United States Patent
Dong et al.

(10) Patent No.: US 10,649,138 B2
(45) Date of Patent: May 12, 2020

(54) OPTICAL DEVICE HAVING A PHOTONIC CHIP WITH ONE OR MORE SUSPENDED FUNCTIONAL PORTIONS

(71) Applicant: Nokia Solutions and Networks OY, Espoo (FI)

(72) Inventors: Po Dong, Holmdel, NJ (US); Kwangwoong Kim, Holmdel, NJ (US); Argishti Melikyan, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/138,122

(22) Filed: Sep. 21, 2018

(65) Prior Publication Data

US 2020/0096702 A1    Mar. 26, 2020

(51) Int. Cl.
| | | |
|---|---|---|
| *G02B 6/12* | (2006.01) | |
| *G02B 6/43* | (2006.01) | |
| *H04B 10/25* | (2013.01) | |
| *G02B 6/42* | (2006.01) | |
| *G02B 6/30* | (2006.01) | |

(52) U.S. Cl.
CPC ......... *G02B 6/12019* (2013.01); *G02B 6/305* (2013.01); *G02B 6/4214* (2013.01); *G02B 6/43* (2013.01); *H04B 10/25* (2013.01)

(58) Field of Classification Search
CPC .............................. G02B 6/12019; G02B 6/305
See application file for complete search history.

(56) References Cited

U.S. PATENT DOCUMENTS

| | | |
|---|---|---|
| 8,121,450 B2 | 2/2012 | Webster et al. |
| 8,750,654 B2 | 6/2014 | Dupuis et al. |
| 8,787,419 B2 | 7/2014 | Behfar |
| 9,057,844 B2 | 6/2015 | Doany et al. |
| 9,274,283 B1 | 3/2016 | Ellis-Monaghan et al. |
| 9,547,129 B1 * | 1/2017 | Kato ........................ G02B 6/26 |

(Continued)

FOREIGN PATENT DOCUMENTS

EP    2703858 A1    3/2014

OTHER PUBLICATIONS

Doerr, C. R., "Silicon photonic integration in telecommunications." Frontiers in Physics 3 (2015): 37.

(Continued)

*Primary Examiner* — Sung H Pak
(74) *Attorney, Agent, or Firm* — Mendelsohn Dunleavy, P.C.; Yuri Gruzdkov

(57) ABSTRACT

A photonic chip having a photonic-circuit layer supported on a substrate, the photonic-circuit layer including a suspended portion that extends beyond the outline of the substrate on the photonic-circuit layer. In various embodiments, the suspended portion may host one or more functional optical elements, such as an on-chip grating coupler, an on-chip microring resonator, and an on chip optical waveguide, that can be used to couple light in and out of the photonic chip. The geometry of the suspended portion enables unencumbered (e.g., double-sided) access to the one or more functional optical elements located therein and can advantageously be used to place an optical fiber and/or a second photonic chip sufficiently close to those functional optical elements to achieve a high chip-to-fiber or chip-to-chip optical-coupling efficiency.

20 Claims, 11 Drawing Sheets

(56) References Cited

U.S. PATENT DOCUMENTS

| | | | |
|---|---|---|---|
| 9,608,407 | B1 | 3/2017 | Raring et al. |
| 9,762,334 | B2 | 9/2017 | Chang et al. |
| 9,766,408 | B2 | 9/2017 | Novack et al. |
| 9,859,687 | B2 | 1/2018 | Stagarescu et al. |
| 2002/0192850 | A1* | 12/2002 | Stoltz .................. G02B 6/124 438/22 |
| 2012/0250007 | A1 | 10/2012 | Na et al. |
| 2013/0233824 | A1 | 9/2013 | Doerr |
| 2016/0047990 | A1* | 2/2016 | Zine-El-Abidine ...... G02B 6/30 385/37 |
| 2018/0210009 | A1* | 7/2018 | Aksyuk ................. G01Q 20/04 |

OTHER PUBLICATIONS

Overton, G., "BinOptics Incorporates Etched Facet Technology (eft) into silicon photonics devices," Laser Focus World, 2013, as retrieved from: http://www.binoptics.com/news_binoptics-offers-optical-engine-keep-moores-law-intact-computing-datacom-industries.html, 2 pages.

Santos, R., et al. "Fabrication of etched facets and vertical couplers in InP for packaging and on-wafer test." IEEE Photonics Technology Letters 28.3 (2016): 245-247.

Melikyan, A., et al. "Optical Grating Coupler with Back-Side Reflector Background," U.S. Appl. No. 15/387,936, filed Dec. 27, 2016, as filed at the U.S. Patent and Trademark Office, 21 pages.

Zaoui, Wissem Sfar, et al. "High-Efficient CMOS-Compatible Grating Couplers with Backside Metal Mirror." European Conference and Exhibition on Optical Communication. Optical Society of America, 2012. (3 pages).

Zaoui, Wissem Sfar, et al. "Cost-effective CMOS-compatible grating couplers with backside metal mirror and 69% coupling efficiency." Optics Express 20.26 (2012): B238-B243.

Sodagar, Majid, et al. "High-efficiency and wideband interlayer grating couplers in multilayer Si/SiO2/SiN platform for 3D integration of optical functionalities." Optics Express 22.14 (2014): 16767-16777.

Benedikovic, Daniel, et al. "Subwavelength index engineered surface grating coupler with sub-decibel efficiency for 220-nm silicon-on-insulator waveguides." Optics express 23.17 (2015): 22628-22635.

\* cited by examiner

100

100

200

300

310

POLISHING AWAY

100

310

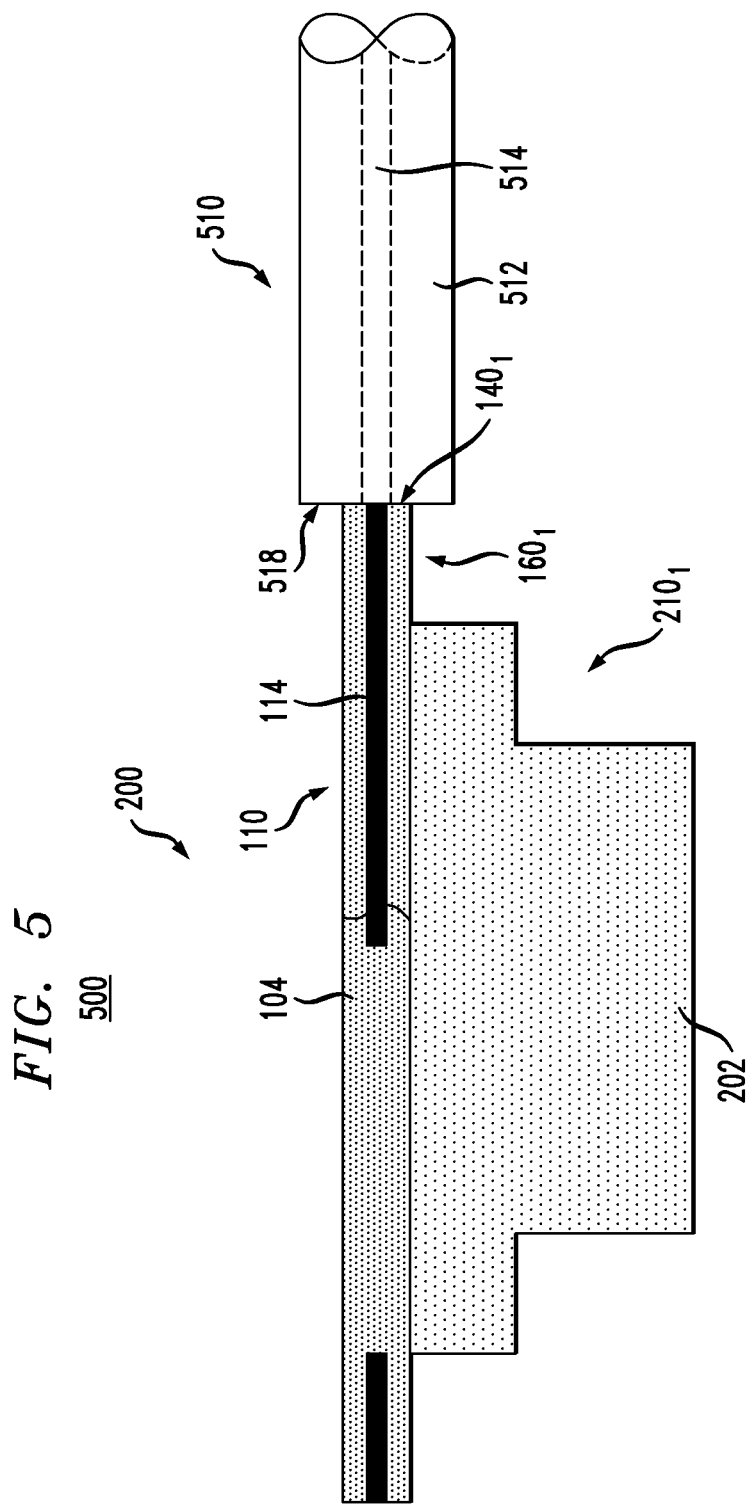

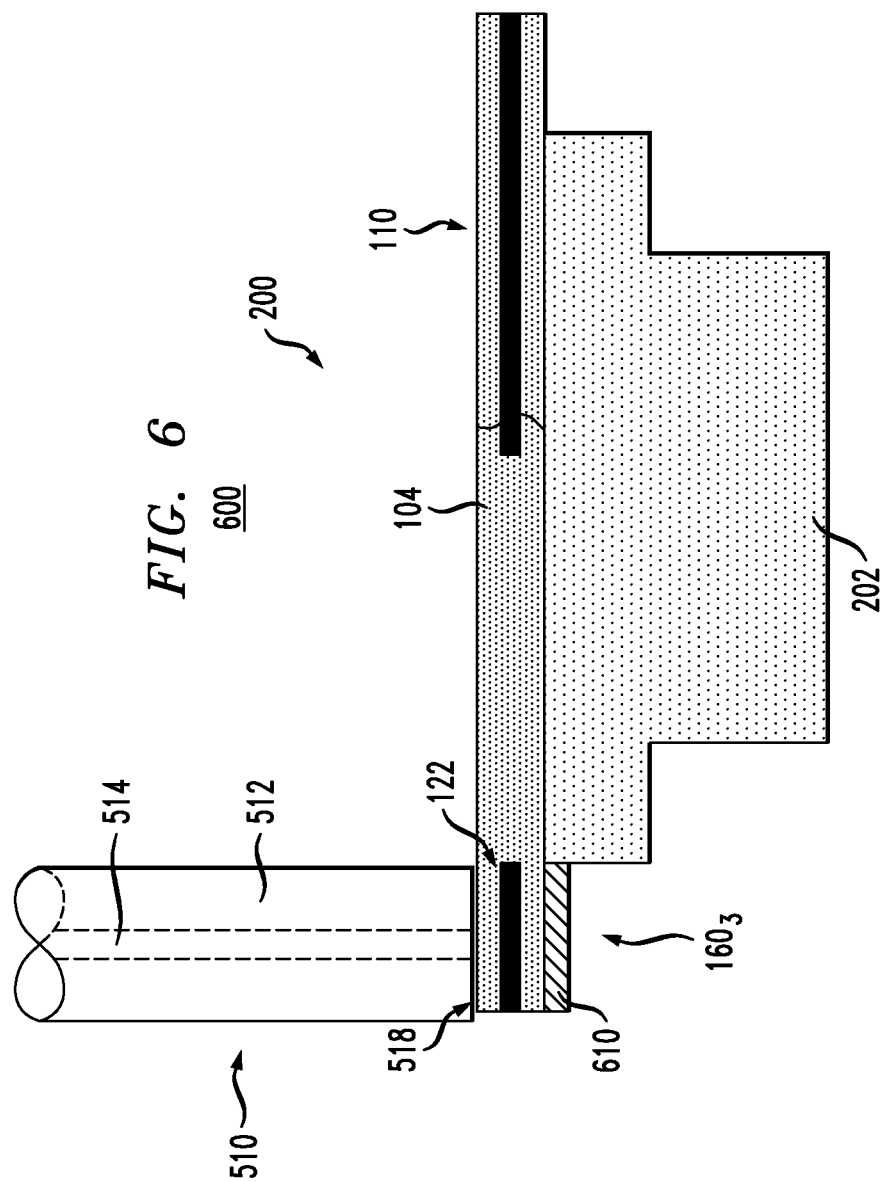

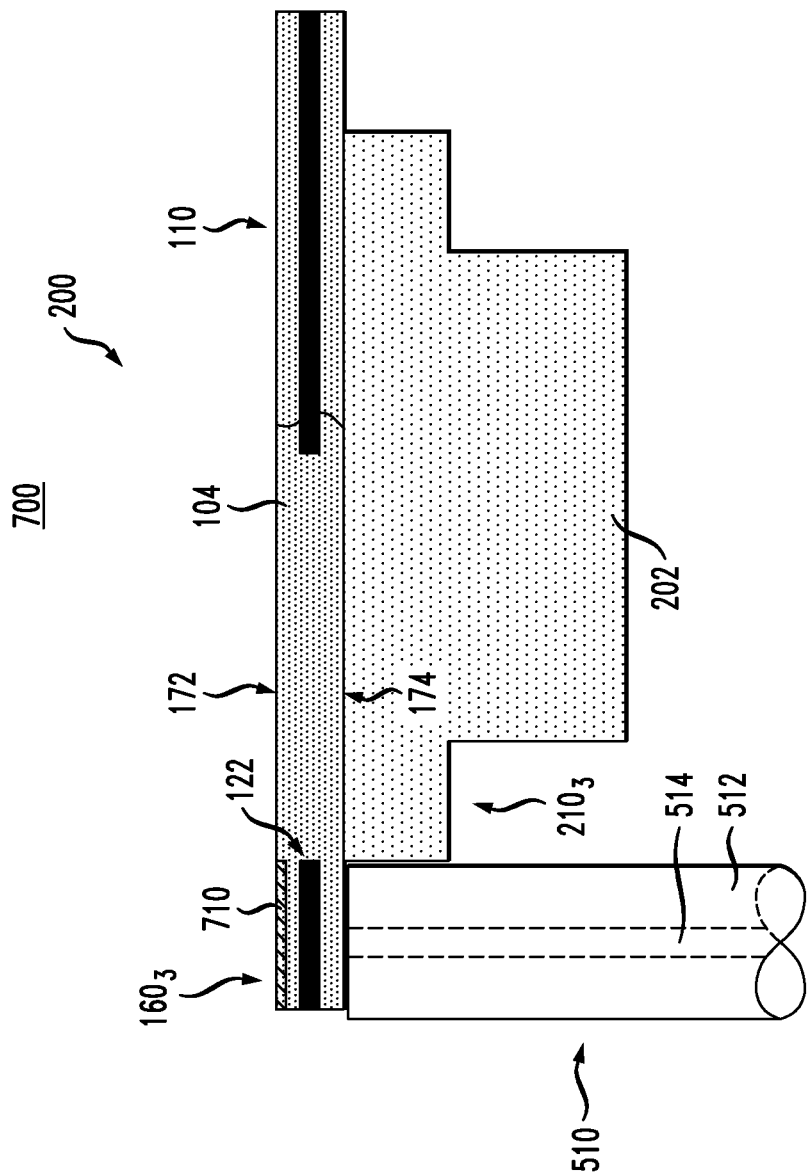

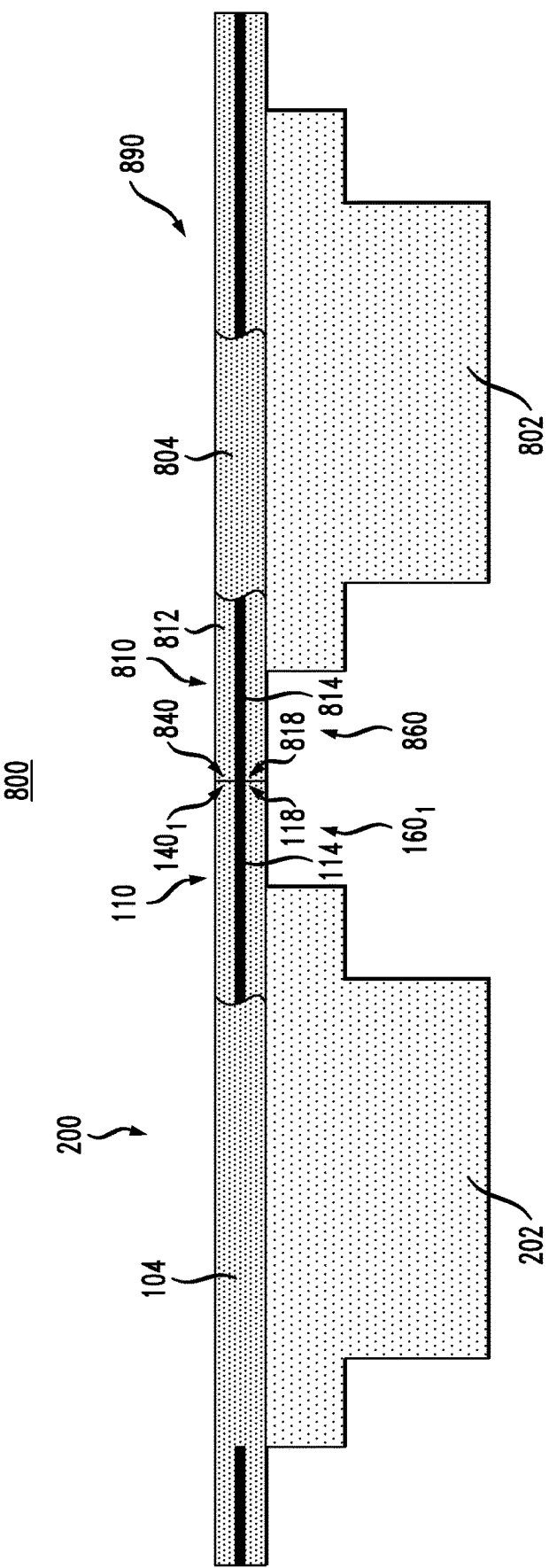

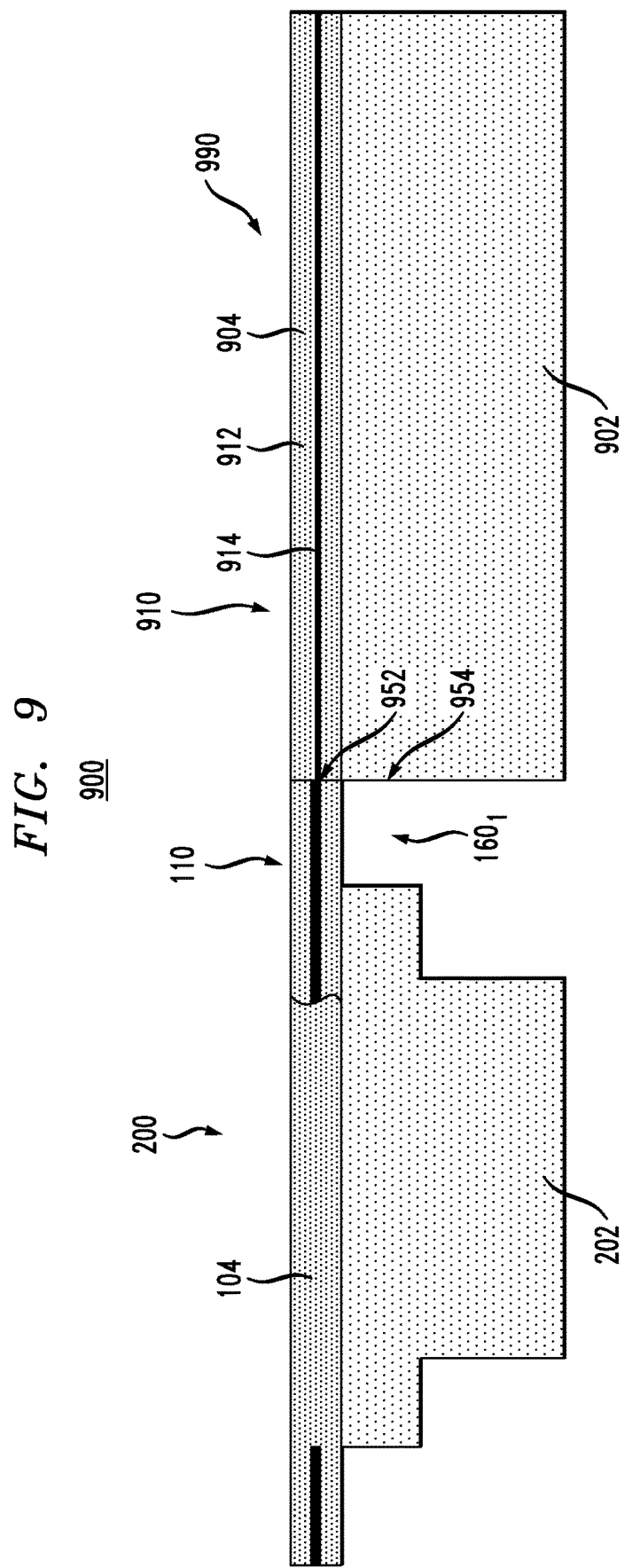

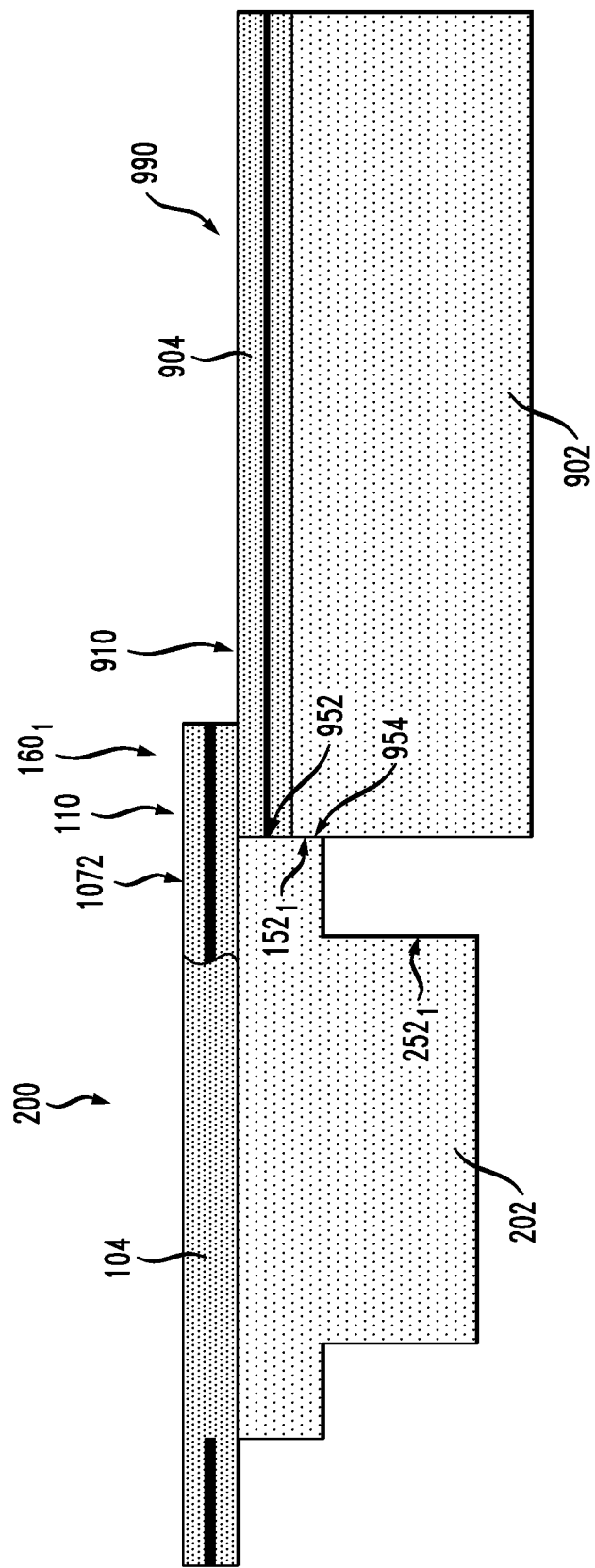

1100

OPTICAL DEVICE HAVING A PHOTONIC CHIP WITH ONE OR MORE SUSPENDED FUNCTIONAL PORTIONS

BACKGROUND

Field

Various example embodiments relate to optical communication equipment and, more specifically but not exclusively, to an optical device constructed using one or more photonic chips.

Description of the Related Art

This section introduces aspects that may help facilitate a better understanding of the disclosure. Accordingly, the statements of this section are to be read in this light and are not to be understood as admissions about what is in the prior art or what is not in the prior art.

Photonic integrated circuits (PICs) are used for various applications in telecommunications, instrumentation, and signal-processing fields. A PIC typically uses optical waveguides to implement and/or interconnect various circuit components, such as optical switches, couplers, routers, splitters, multiplexers/demultiplexers, filters, modulators, phase shifters, lasers, optical amplifiers, wavelength converters, optical-to-electrical (O/E) and electrical-to-optical (E/O) signal converters, etc. An optical waveguide in a PIC is usually an on-chip solid light conductor that guides light due to an index-of-refraction contrast between the waveguide's core and cladding.

For proper operation, a PIC typically needs to efficiently couple light into and out of one or more on-chip optical waveguides.

SUMMARY OF SOME SPECIFIC EMBODIMENTS

Disclosed herein are various embodiments of a photonic chip having a photonic-circuit layer supported on a substrate, the photonic-circuit layer including a suspended portion that extends beyond the outline of the substrate on the photonic-circuit layer. In various embodiments, the suspended portion may host one or more functional optical elements, such as an on-chip grating coupler, an on-chip microring resonator, and an on chip optical waveguide, that can be used to couple light in and out of the photonic chip. The geometry of the suspended portion enables unencumbered (e.g., double-sided) access to the one or more functional optical elements located therein and can advantageously be used to place an optical fiber and/or a second photonic chip sufficiently close to those functional optical elements to achieve a high chip-to-fiber or chip-to-chip optical-coupling efficiency.

According to an example embodiment, provided is an apparatus comprising a first photonic chip that comprises: a photonic-circuit layer having a first major surface and a second major surface, the first and second major surfaces being opposite to one another and substantially parallel to a main plane of the first photonic chip, the photonic-circuit layer comprising an on-chip optical waveguide; and a monolithic substrate attached to the second major surface of the photonic-circuit layer; and wherein the photonic-circuit layer includes an edge portion having at least a part of the on-chip optical waveguide, the edge portion being located outside an outline of the monolithic substrate on the second major surface.

According to another example embodiment, provided is an apparatus comprising a first photonic chip that comprises: a photonic-circuit layer having opposite first and second major surfaces, the photonic-circuit layer comprising an optical device; and a monolithic substrate attached to the photonic-circuit layer by the second major surface without being vertically over or under an edge portion of the photonic-circuit layer, the monolithic substrate being thicker than the photonic-circuit layer; and wherein at least a part of the optical device is located in the edge portion of the photonic-circuit layer.

BRIEF DESCRIPTION OF THE DRAWINGS

Other aspects, features, and benefits of various disclosed embodiments will become more fully apparent, by way of example, from the following detailed description and the accompanying drawings, in which:

FIG. 5 schematically shows an optical device having a chip-to-fiber optical coupling arrangement according to an embodiment;

FIG. 6 schematically shows an optical device having a chip-to-fiber optical coupling arrangement according to another embodiment;

FIG. 7 schematically shows an optical device having a chip-to-fiber optical coupling arrangement according to yet another embodiment;

FIG. 8 schematically shows an optical device having a chip-to-chip optical coupling arrangement according to an embodiment;

FIG. 9 schematically shows an optical device having a chip-to-chip optical coupling arrangement according to another embodiment;

FIG. 10 schematically shows an optical device having a chip-to-chip optical coupling arrangement according to yet another embodiment.

DETAILED DESCRIPTION

Figure 1A:
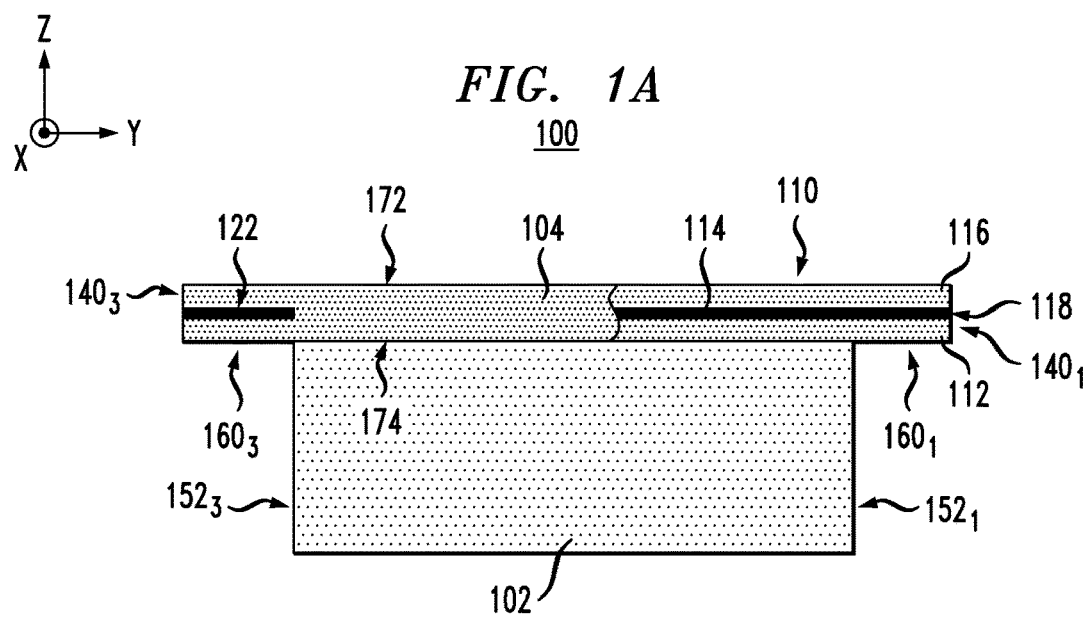
FIGS. 1A-1B show a cross-sectional side view and a top view, respectively, of a photonic chip according to an embodiment.

Some embodiments may benefit from the use of at least some features disclosed in U.S. patent application Ser. No. 15/387,936, which is incorporated herein by reference in its entirety.

As used herein, the term "photonic integrated circuit" (or PIC) should be construed to cover planar lightwave circuits (PLCs), integrated optoelectronic devices, wafer-scale products on substrates, individual photonic chips and dies, and hybrid devices. Example materials systems that can be used for manufacturing various PICs may include but are not limited to III-V semiconductor materials, silicon photonics, silica-on-silicon products, silica-glass-based PLCs, polymer integration platforms, Lithium Niobate and derivatives, non-linear optical materials, etc. Both packaged devices (e.g., wired-up and/or encapsulated chips) and unpackaged devices (e.g., dies) can be referred to as PICs.

Some photonic chips may have flat facets for optical edge coupling. This type of photonic chips can be implemented, e.g., using III-V substrates, which can be cleaved. Some glass PLCs and some silicon-photonics chips may also have similar edge structures. However, polishing is typically used instead of or in addition to cleaving in these products. Polishing can be a relatively expensive technique when applied to making optical facets. Some photonic chips may have an etched facet and/or a diced facet. Diced facets may extend relatively far out from the main body of the chip and be configured to protect adjacent etched facets during dicing. However, this particular structure can make optical coupling relatively difficult, e.g., because edge coupling typically relies on the ability to place an optical fiber or a second photonic chip sufficiently close to the corresponding optical facet.

These and possibly some related problems in the state of the art are addressed by various embodiments of a photonic chip in which at least one suspended portion extends outside the outline of the remainder of the chip. The suspended portion may host one or more functional optical elements, e.g., a grating coupler, a microring resonator, a tapered waveguide, and the like, that can be used to facilitate coupling of light in and out of the photonic chip. The geometry of the suspended portion advantageously enables unencumbered physical access to the functional optical elements located therein and can be used to place an optical fiber or a second photonic chip sufficiently close thereto for efficient optical coupling.

The following gives a brief description of some technological processes that can be used to fabricate some photonic chips according to various embodiments.

As used herein, the term "hybrid integrated circuit" (or device) refers to a multi-component circuit constructed of multiple monolithic integrated circuits (e.g., photonic chips and conventional electronic integrated circuits (ICs)) and possibly some discrete circuit components, all attached to each other to be mountable on and electrically connectable to a common base or carrier. A representative hybrid circuit may include (i) one or more packaged or non-packaged dies, with some or all of the dies including optical, optoelectronic, and/or semiconductor devices, and (ii) one or more optional discrete components, such as connectors, resistors, capacitors, and inductors. Electrical connections between the ICs, photonic chips, dies, and discrete components can be formed, e.g., using patterned conducting (such as metal) layers, ball-grid arrays, solder bumps, wire bonds, etc. Optical connections between the photonic chips, dies, and discrete components can be formed, e.g., using optical couplers, fibers, and/or waveguides.

In a typical fabrication process, dies are produced in relatively large batches using suitable wafers. Electrical and optical circuits can be gradually created on a wafer using a multi-step sequence of photolithographic and chemical processing steps. Each wafer is then cut ("diced") into many pieces (chips, dies), each containing a respective copy of the circuit that is being fabricated. Each individual die can be appropriately packaged prior to being incorporated into a corresponding PIC or be left non-packaged.

Dies intended for wire-bond packages are outfitted with small metal pads, typically located near the die edges. The individual dies are cut out of the wafer, and each die can be attached to its carrier, such as an interconnecting substrate, a redistribution layer, an interposer, a laminate plate, a wire board, or the like. Electrical wires can then be bonded to the metal pads on the face of the die to electrically connect the die to the carrier. These wires and the patterned conducting layers located in the body and/or on the surface of the carrier provide electrical connections between the die and the corresponding pins or terminals, e.g., located on the outside of the package. These pins/terminals can then be used to electrically connect the corresponding package to other circuits of the corresponding device and/or to external electrical circuitry.

Processing a die intended for a flip-chip assembly is similar but has several additional and/or modified processing steps. For example, the small metal pads on the face of the die can be arranged in a two-dimensional area array instead of being in one or more linear edge arrays. This design feature can be realized, e.g., by adding dielectric and metal layers configured to appropriately route electrical connections from the functional layer(s) of the die to the metal pads. A small dot (bump, ball) of solder can then be deposited on each metal pad. The wafer is then diced as customary. The resulting individual dies are fluxed and placed on the respective interconnecting substrates or mating dies face down (e.g., in a flipped orientation compared to that in a wire-bond package). The solder is then reflowed by being heated to above its melting temperature to form permanent electrical connections between the die and the substrate or mating die.

In some embodiments, individual chips can be stacked. As used herein, the term "stack" refers to an orderly arrangement of packaged or non-packaged dies in which the main planes of the stacked dies are substantially parallel to each other. The main plain of the die is the plane parallel to a substantially planar surface thereof that has the largest sizes, e.g., length and width, among all exterior surfaces of the die. The exterior surfaces of the die that have one relatively large size, e.g., length, and one relatively small size, e.g., height, are typically referred to as the edges of the die. A stack can typically be mounted on a carrier in an orientation in which the main plains of the stacked dies are parallel to each other and/or to the main plane of the carrier.

Various photonic-chip features that can be used for chip-to-fiber and/or chip-to-chip optical coupling are described in more detail below in reference to FIGS. 1-11.

Figure 1B:
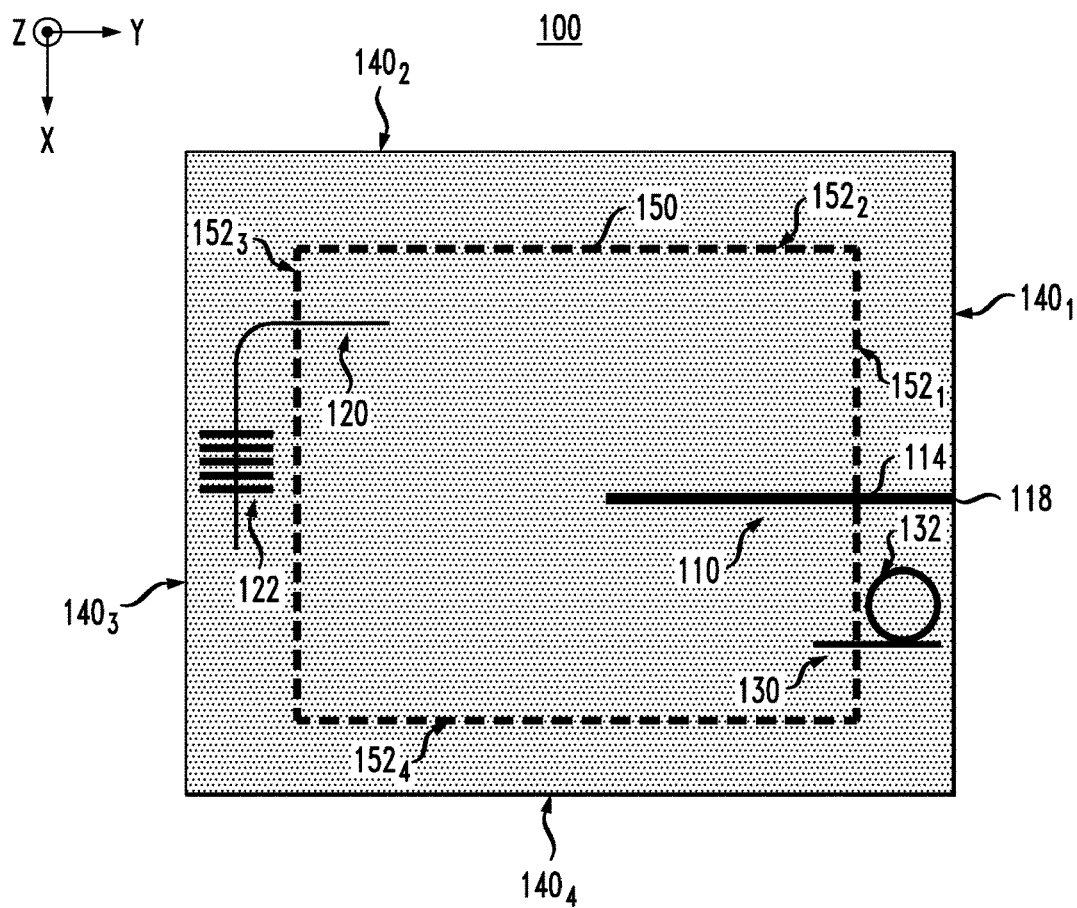

FIGS. 1A-1B show a cross-sectional side view and a top view, respectively, of a photonic chip 100 according to an embodiment. The XYZ Cartesian coordinate system is shown in each of the figures to more-precisely indicate the relative orientation of the shown views. The XY-coordinate plane is parallel to the main plane of photonic chip 100.

Photonic chip 100 comprises a substrate layer 102 and a photonic-circuit layer 104 that are directly attached to one another as indicated in FIG. 1. Photonic-circuit layer 104 has exterior surfaces 172 and 174 that are substantially planar (e.g., neglecting possible feature-height variations thereon) and parallel to the main plane of photonic chip 100. Photonic-circuit layer 104 typically includes two or more sub-layers made of different materials or of differently doped materials to implement therein the physical structures of various circuit elements. For example, FIG. 1A explicitly shows sub-layers 112, 114, and 116 that are used to implement the lower cladding, the core, and the upper cladding, respectively, of an optical waveguide 110. Additional sub-layers (not explicitly shown in FIG. 1A) of photonic-circuit layer 104 can be used and configured, as known in the pertinent art, to implement other circuit elements of the photonic circuit fabricated in photonic-circuit layer 104. In some embodiments, photonic-circuit layer 104 may include one or more metal sub-layers configured to provide on-chip electrical connections (e.g., see FIG. 7).

In some embodiments, substrate layer 102 may similarly comprise two or more sub-layers (not explicitly shown in FIG. 1A).

In FIG. 1B, a dashed line 150 shows the outline of substrate layer 102 on the main plane of photonic chip 100. As used herein, the term "outline" refers to an area on a plane covered by and representing an orthogonal projection of the corresponding physical structure onto that plane. For example, the outline of substrate layer 102 on the main plane of photonic chip 100 is the orthogonal projection of the substrate layer onto the XY-coordinate plane. Similarly, the outline of photonic-circuit layer 104 on the main plane of photonic chip 100 is the orthogonal projection of the photonic-circuit layer onto the XY-coordinate plane. As shown in FIG. 1B, the outline 150 is the orthogonal projection of substrate layer 102 onto the exterior surface 174 of photonic-circuit layer 104. The outline 150 is defined by edges $152_1$-$152_4$.

In an example embodiment, the geometric relationship between the outlines of layers 102 and 104 can be characterized by one or more of the following features.

One or more edges 140 of photonic-circuit layer 104 may extend out to be located beyond the outline 150 of substrate layer 102 on the exterior surface 174.

A portion 160 of photonic-circuit layer 104 located between an edge 140 thereof and a corresponding (e.g., nearby) edge 152 of substrate layer 102 can be referred to as a suspended portion, e.g., because it is not directly vertically (i.e., along the Z coordinate) connected or attached to the substrate layer. As an example, two such suspended portions, labeled $160_1$ and $160_3$, respectively, are shown in FIG. 1A. More specifically, suspended portion $160_1$ of photonic-circuit layer 104 is located between the edge $140_1$ thereof and an edge $152_1$ of substrate layer 102. Suspended portion $160_3$ of photonic-circuit layer 104 is similarly located between the edge $140_3$ thereof and an edge $152_3$ of substrate layer 102.

In the view shown in FIG. 1A, a suspended portion 160 can be referred to as an "overhang." The overhang extends out from the top of substrate layer 102 such that no portion of the substrate layer is located vertically below the suspended portion 160.

If the view shown in FIG. 1A is flipped (e.g., rotated by 180 degrees about the X-coordinate axis), then a suspended portion 160 can be referred to as a "ledge." In that view, the ledge extends out from the bottom of substrate layer 102 such that no portion of the substrate layer is located vertically above the suspended portion 160.

A person of ordinary skill in the art will understand that some of the terms used in the description of photonic chip 100 may be used interchangeably, depending on the view or projection that is being described or referred to.

Depending on the embodiment, the photonic circuit of layer 104 may include at least some of the following circuit elements: (i) one or more optical waveguides, such as optical waveguides 110, 120, and 130 shown in FIG. 1B; (ii) an optical grating, such as an optical grating 122 (FIG. 1B); (iii) a ring resonator, such as a ring resonator 132 (FIG. 1B); (iv) an optical coupler; (v) an optical splitter and/or combiner; (vi) an optical multiplexer/demultiplexer; (vii) an optical filter; (viii) an optical modulator; (ix) an optical phase shifter, (x) a light source, such as a laser and/or an optical amplifier; (xi) a photodetector; (xii) an optical switch, etc.

Optical waveguide 110 has an end 118 that is located at an edge $140_1$ of photonic-circuit layer 104. A portion of optical waveguide 110 crosses the width of suspended portion $160_1$. In operation, optical waveguide 110 may guide light applied to the end 118 by an external light source into interior portions (e.g., corresponding to outline 150, FIG. 1B) of photonic-circuit layer 104 or guide light generated in the interior portions of the photonic-circuit layer to the end 118 for further transmission to an external circuit or device.

Optical grating 122 is located in suspended portion $160_3$. In operation, optical grating 122 may be used to: (i) couple light applied thereto by an input light beam propagating substantially parallel to (e.g., to within ±10 degrees of) the Z-coordinate axis into optical waveguide 120 or (ii) form an output light beam propagating substantially parallel to the Z-coordinate axis by redirecting the light received through optical waveguide 120. As such, optical grating 122 can operate as an on-chip grating coupler. In various embodiments, optical grating 122 can be a one-dimensional grating or a two-dimensional grating.

Ring resonator 132 is located in suspended portion $160_1$. In operation, ring resonator 132 may be used, e.g., as an optical filter or switch acting on the light propagating through optical waveguide 130. In some embodiments, ring resonator 132 may be used as an optical modulator.

Figure 2:
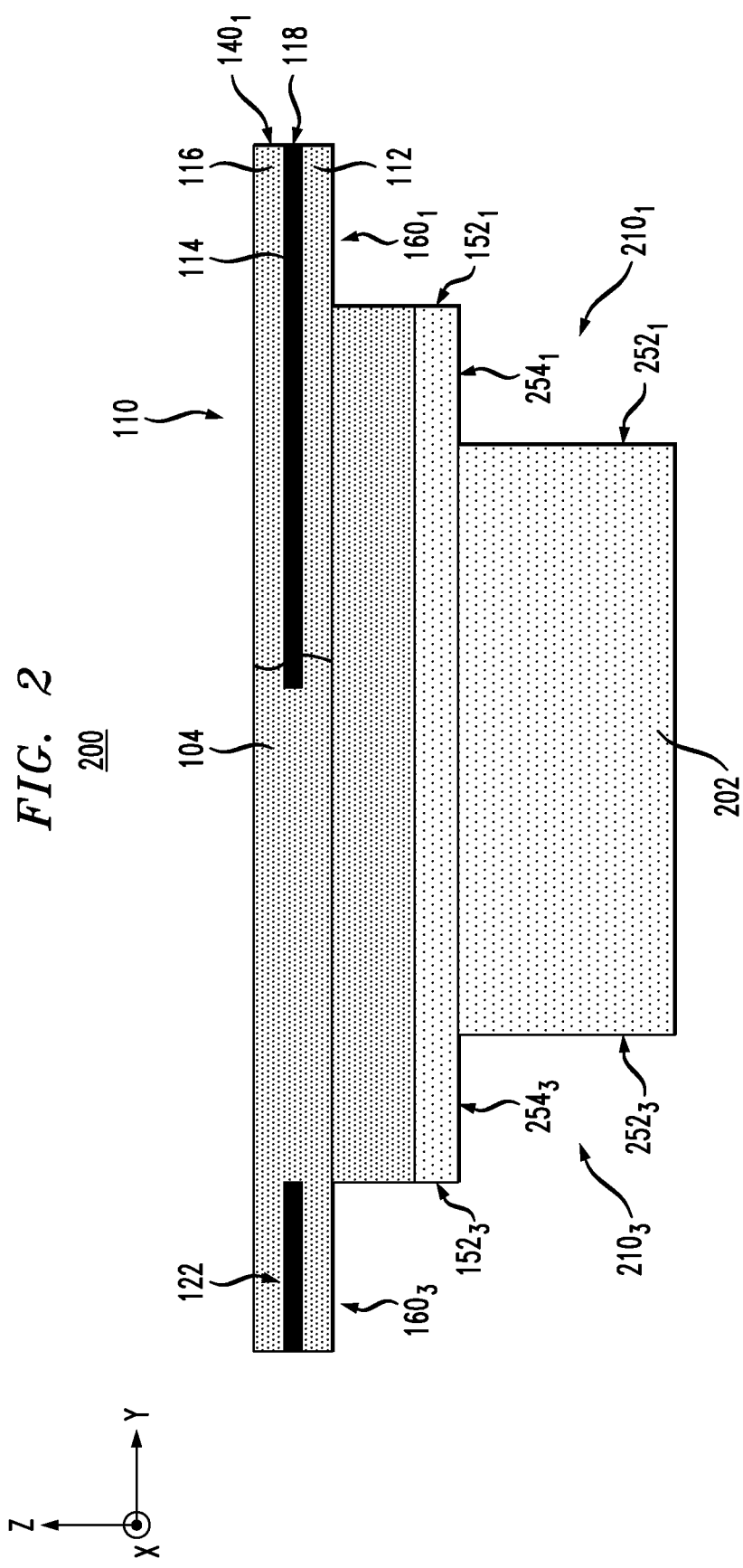
FIG. 2 shows a cross-sectional side view of a photonic chip according to an alternative embodiment.

FIG. 2 shows a cross-sectional side view of a photonic chip 200 according to an alternative embodiment. Photonic chip 200 is a modification of photonic chip 100 shown in FIGS. 1A-1B. The XYZ Cartesian coordinate system is shown in FIG. 2 to more-precisely indicate the relationship between the views shown in FIGS. 1-2. The XY-coordinate plane is parallel to the main plane of photonic chip 200.

Photonic chip 200 comprises a substrate layer 202 and photonic-circuit layer 104 that are directly attached to one another as indicated in FIG. 2. Photonic-circuit layer 104 has already been described above in reference to FIGS. 1A-1B. Substrate layer 202 can be formed, e.g., by modifying substrate layer 102 (FIG. 1A). In one possible embodiment, substrate layer 202 can be fabricated by removing some of the substrate material from substrate layer 102 (e.g., see FIGS. 4A-4B).

For example, a step-like feature $210_1$ can be formed by removing some of the substrate material adjacent to edge $152_1$. The resulting step-like feature $210_1$ includes an edge $252_1$ and an edge $254_1$. Edge $252_1$ is located at an offset distance from edge $152_1$ and is closer to the center portion of photonic chip 200 than edge $152_1$, e.g., inside the outline 150 (also see FIG. 1B). In some embodiments, edge $252_1$ can be parallel to edge $152_1$. In some embodiments, edge $254_1$ can be parallel to the main plane of photonic chip 200.

A step-like feature $210_3$ can similarly be formed by removing some of the substrate material adjacent to edge $152_3$. Step-like feature $210_3$ includes an edge 2523 and an edge $254_3$ that are analogous to edges $252_1$ and $254_1$, respectively.

FIGS. 3A-3E pictorially illustrate a fabrication method that can be used to make photonic chip 100 according to an embodiment. Each of FIGS. 3A-3E shows a cross-sectional side view of the respective structure.

Figure 3A:
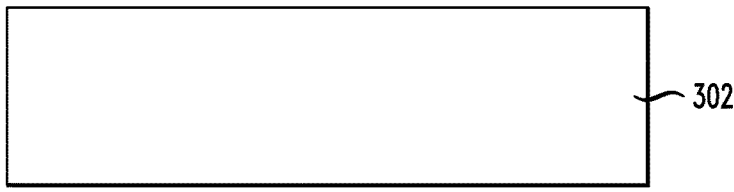
FIGS. 3A-3E pictorially illustrate a fabrication method that can be used to make the photonic chip shown in FIGS. 1A-1B according to an embodiment.

FIG. 3A shows a substrate 302 that can be used to start the fabrication process. The processing steps outlined below transform substrate 302 into substrate layer 102.

Figure 3B:
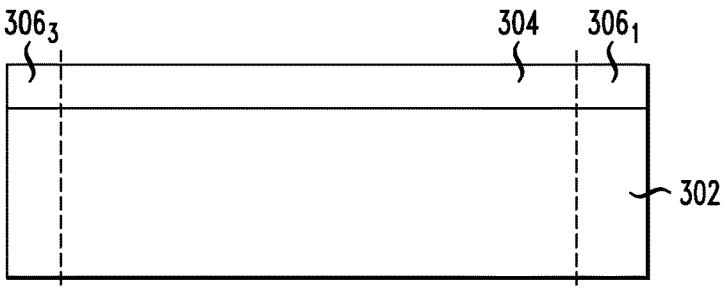

FIG. 3B shows a nascent photonic chip 300. In addition to substrate 302, photonic chip 300 includes a photonic-circuit layer 304 formed on substrate 302, e.g., as known in the pertinent art. For example, photonic-circuit layer 304 can be gradually created on substrate 302 using a suitable multi-step sequence of photolithographic, chemical, and mechanical processing steps. Photonic-circuit layer 304 may differ from photonic-circuit layer 104, e.g., in that photonic-circuit layer 304 may have some (e.g., serving a manufacturing purpose) layer portions that are later removed or modified to arrive at the final structure of photonic-circuit layer 104.

Figure 3C:
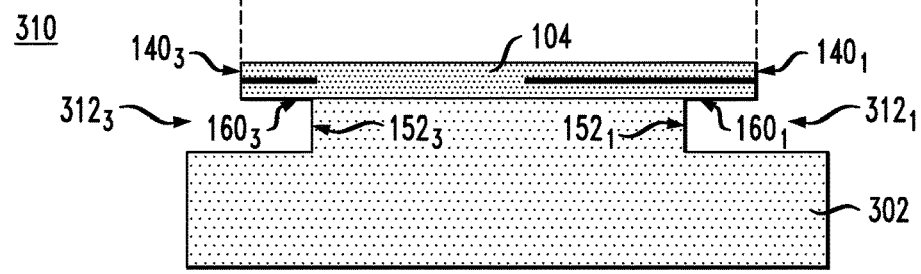

FIG. 3C shows a nascent photonic chip 310 that is produced by further modifying photonic chip 300 of FIG. 3B.

For example, in a first set of processing steps that transform photonic chip 300 into photonic chip 310, photonic-circuit layer 304 may be patterned and etched to remove and/or modify some portions thereof. As an example, FIGS. 3B and 3C indicate that portions 3061 and 3063 of photonic-circuit layer 304 are removed during this first set of processing steps to form edges $140_1$ and $140_3$ (also see FIG. 1A). In an example embodiment, the first set of processing steps leaves substrate 302 substantially unchanged, e.g., due to (i) the use of different respective materials in substrate 302 and photonic-circuit layer 304 and (ii) the use of etchants that do not react with the material(s) of substrate 302 or the protective masks.

In a second set of processing steps that transform photonic chip 300 into photonic chip 310, isotropic etching can be applied to substrate 302. In an example embodiment, the second set of processing steps leaves photonic-circuit layer 304 substantially unchanged, e.g., due to (i) the use of different respective materials in substrate 302 and photonic-circuit layer 304 and (ii) the use of etchants that do not react with the material(s) of photonic-circuit layer 304 or the protective masks. As an example, FIGS. 3B and 3C indicate that some portions of substrate 302 are removed during this second set of processing steps to create undercuts $312_1$ and $312_3$ that release portions $160_1$ and $160_3$, respectively (also see FIG. 1B). The inner wall of undercut $312_1$ may be later transformed into edge $152_1$ (also see FIGS. 1A and 3E). Similarly, the inner wall of undercut $312_3$ may be later transformed into edge $152_3$ (also see FIGS. 1A and 3E).

Figure 3D:
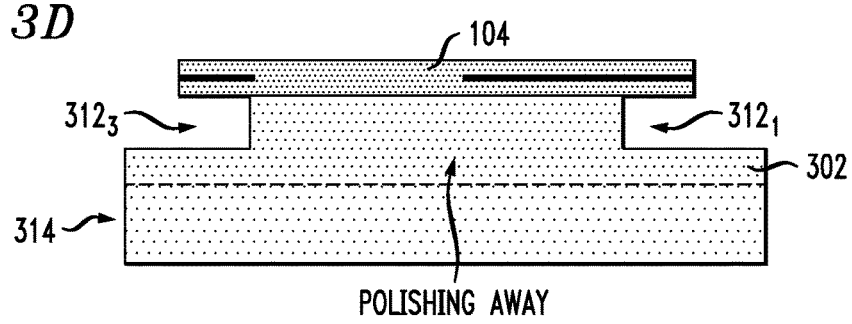
Figure 3E:
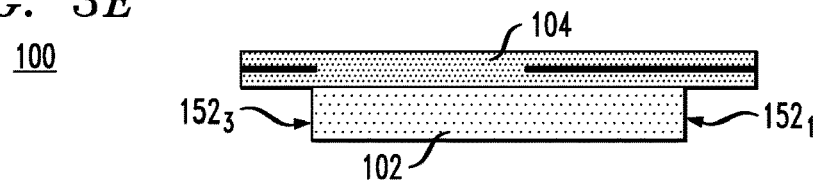

FIG. 3D pictorially shows a polishing step during which a bottom portion 314 of substrate 302 is gradually polished away (removed by polishing) until the undercuts $312_1$ and $312_3$ are reached from the bottom of the substrate. This polishing step transforms substrate 302 into substrate layer 102 as indicated by the differences in the structures shown in FIGS. 3D and 3E.

Figure 4A:
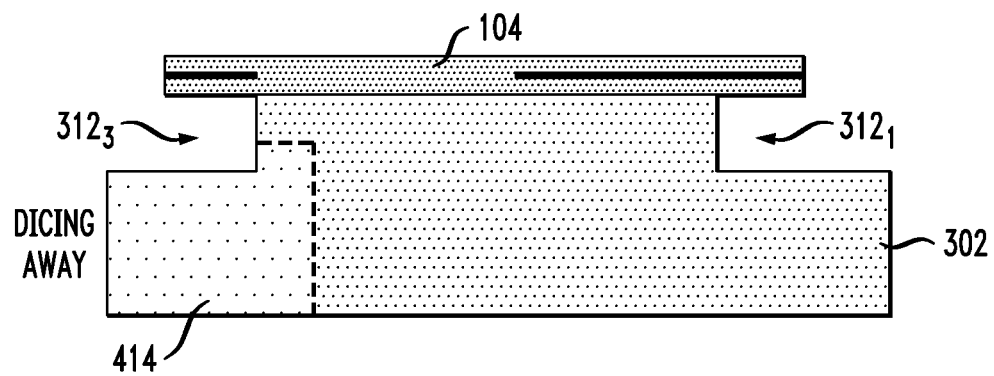
FIGS. 4A-4B pictorially illustrate a fabrication method that can be used to make the photonic chip shown in FIG. 2 according to an embodiment.
Figure 4B:
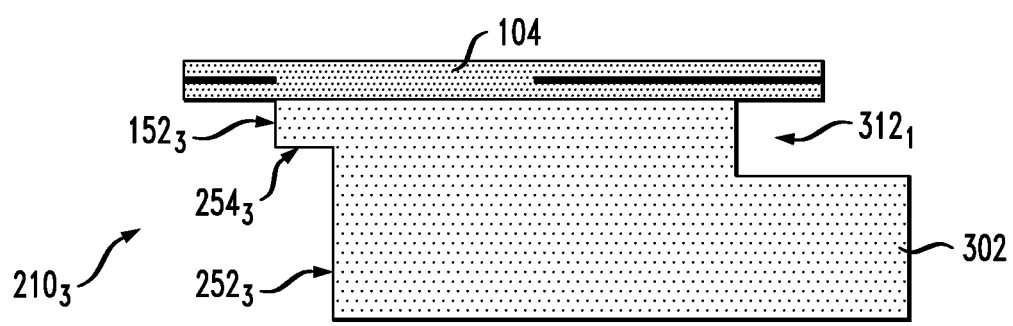

FIGS. 4A-4B pictorially illustrate a fabrication method that can be used to make photonic chip 200 according to an embodiment. Each of FIGS. 4A-4B shows a cross-sectional side view of the respective structure. The fabrication method illustrated by FIGS. 4A-4B can start with nascent photonic chip 310, which can be made, e.g., as described above in reference to FIGS. 3A-3C.

FIG. 4A pictorially shows a dicing step during which a side portion 414 of substrate 302 is diced away (e.g., removed by cutting and/or milling) until the undercut $312_3$ is reached and the step-like feature $210_3$ is created. The resulting shape of substrate 302 is shown in FIG. 4B. A person of ordinary skill in the art will understand that a similar dicing step can be used to remove a side portion of substrate 302 adjacent to the undercut $312_1$, thereby producing the photonic-chip structure shown in FIG. 2.

FIG. 5 schematically shows an optical device 500 according to an embodiment. Device 500 has a chip-to-fiber optical-coupling arrangement in which photonic chip 200 (FIG. 2) is optically coupled to an optical fiber 510. A person of ordinary skill in the art will understand that, in an alternative embodiment of device 500, photonic chip 200 can be replaced by photonic chip 100 (FIGS. 1A-1B).

Fiber 510 has an optical core 514 and an optical cladding 512. An end 518 of fiber 510 is positioned next to edge $140_1$ of photonic chip 200 such that optical core 114 of the on-chip optical waveguide 110 is approximately aligned with optical core 514. In some embodiments, the end 518 of fiber 510 can be in direct physical contact with edge $140_1$ (e.g., as indicated in FIG. 5). In some other embodiments, device 500 may have an additional optical element (e.g., a lens, not explicitly shown in FIG. 5) located between the end 518 and edge $140_1$. In an example embodiment, an end section of fiber 510 is approximately parallel to the main plane of photonic chip 200 and approximately orthogonal to edge $140_1$.

The use of suspended portion $160_1$ for connecting fiber 510 and the optional presence of step-like feature $210_1$ in device 500 can advantageously make access to photonic chip 200 easier, e.g., for the purposes of assembling device 500 and/or achieving a relatively high chip-to-fiber optical coupling efficiency.

FIG. 6 schematically shows an optical device 600 according to another embodiment. Device 600 has a chip-to-fiber optical-coupling arrangement in which photonic chip 200 (FIG. 2) is optically coupled to optical fiber 510. A person of ordinary skill in the art will understand that, in an alternative embodiment of device 600, photonic chip 200 can be replaced by photonic chip 100 (FIGS. 1A-1B).

In device 600, the end 518 of fiber 510 is positioned next to the suspended portion $160_3$ of photonic chip 200 and approximately aligned with optical grating 122 thereat (also see FIGS. 1B and 2). In some embodiments, the end 518 of fiber 510 can be in direct physical contact with the suspended portion $160_3$ of photonic-circuit layer 104 (e.g., as indicated in FIG. 6). In some other embodiments, device 600 may have an additional optical element (e.g., a lens, not explicitly shown in FIG. 6) located between the end 518 and the suspended portion $160_3$. In an example embodiment, the end section of fiber 510 can be approximately orthogonal to the main plane of photonic chip 200.

In some embodiments, device 600 may have an optional mirror 610 formed on or attached to the substrate side of suspended portion $160_3$, e.g., as indicated in FIG. 6. In operation, mirror 610 can reflect light that passes through optical grating 122 back towards the optical grating, thereby providing at least two passes through the optical grating for the light emitted by fiber 510. As a result, mirror 610 can be used to beneficially increase the coupling efficiency between fiber 510 and on-chip optical waveguide 120 (also see FIG. 1A).

FIG. 7 schematically shows an optical device 700 according to yet another embodiment. Device 700 has a chip-to-fiber optical coupling arrangement in which photonic chip 200 (FIG. 2) is optically coupled to optical fiber 510. A person of ordinary skill in the art will understand that, in an alternative embodiment of device 700, photonic chip 200 can be replaced by photonic chip 100 (FIGS. 1A-1B).

Similar to the coupling arrangement of device 600 (FIG. 6), in the coupling arrangement of device 700, the end 518 of fiber 510 is positioned next to the suspended portion $160_3$ of photonic chip 200 and approximately aligned with optical grating 122 thereat (also see FIGS. 1B and 2). However, the coupling arrangement of device 700 differs from the coupling arrangement of device 600 in that the end 518 of fiber 510 has been moved from the outer surface 172 of photonic-circuit layer 104 to the substrate side thereof. That is: the end 518 of fiber 510 and substrate layer 202 are now directly connected to the same side of photonic-circuit layer 104, e.g., surface 174.

In some embodiments, the end 518 of fiber 510 can be in direct physical contact with suspended portion $160_3$ of photonic-circuit layer 104 (e.g., as indicated in FIG. 7). In some other embodiments, device 700 may have an additional optical element (e.g., a lens, not explicitly shown in FIG. 7) located between the end 518 and the suspended portion $160_3$. In an example embodiment, the end section of fiber 510 can be approximately orthogonal to the main plane of photonic chip 200.

In some embodiments, photonic chip 200 in device 700 may have an optional mirror 710 formed above optical grating 122 in suspended portion $160_3$, e.g., using one or more of the metal sub-layers of photonic-circuit layer 104. In operation, mirror 710 can reflect light that passes through optical grating 122 back towards the optical grating, thereby providing at least two passes through the optical grating for the light emitted by fiber 510. As a result, mirror 710 can be used to beneficially increase the coupling efficiency between fiber 510 and on-chip optical waveguide 120 (also see FIG. 1A).

The use of suspended portion $160_3$ for connecting fiber 510 and the optional presence of step-like feature $210_3$ in device 700 can advantageously make access to photonic chip 200 easier, e.g., for the purposes of assembling device 700 and/or achieving a relatively high chip-to-fiber optical coupling efficiency.

FIG. 8 schematically shows an optical device 800 according to an embodiment. Device 800 has a chip-to-chip optical-coupling arrangement in which photonic chip 200 (FIG. 2) is optically coupled to another photonic chip, which is labeled in FIG. 8 using the reference numeral 890. A person of ordinary skill in the art will understand that, in an alternative embodiment of device 800, photonic chip 200 can be replaced by photonic chip 100 (FIGS. 1A-1B).

In an example embodiment, photonic chip 890 can be analogous to photonic chip 200 (FIG. 2) or photonic chip 100, but possibly have a different photonic circuit implemented in a photonic-circuit layer 804 thereof. A substrate layer 802 of photonic chip 890 can be similar to substrate layer 202 or substrate layer 102. In some embodiments, photonic chip 890 can be a nominal copy (e.g., a mirror image) of photonic chip 200.

For illustration purposes and without any implied limitations, FIG. 8 shows an embodiment in which photonic chip 890 comprises an on-chip optical waveguide 810 at least a portion of which is located in a suspended portion 860 of photonic-circuit layer 804. Optical waveguide 810 comprises an optical core 814 and an optical cladding 812 and has an end 818 located at an edge 840 of suspended portion 860 in photonic-circuit layer 804. The edge 840 of suspended portion 860 is positioned next to the edge $140_1$ of photonic chip 200 such that the end 818 of optical waveguide 810 is placed near the end 118 of optical waveguide 110.

In some embodiments, the edge $140_1$ of photonic chip 200 and the edge 840 of photonic chip 890 can be in direct physical contact with one another. In some other embodiments, device 800 may have an additional optical element (e.g., a lens, not explicitly shown in FIG. 8) located between the edges $140_1$ and 840. In some embodiments, the waveguide ends 118 and 818 can be in direct physical contact with one another. In an example embodiment, photonic-circuit layers 104 and 804 can be approximately parallel to (e.g., to within ±10 degrees of) one another and/or approximately coplanar with one another.

In some embodiments, photonic chip 890 can be flipped with respect to the orientation shown in FIG. 8. In the resulting flipped configuration, substrate layers 202 and 802 are located on the opposite sides of the plane running through photonic-circuit layers 104 and 804 parallel to the main planes of photonic chips 200 and 890.

The use of suspended portions $160_1$ and 860 for optically coupling the two chips to one another can advantageously make access to the corresponding on-chip waveguides easier, e.g., for the purposes of assembling device 800 and/or achieving a relatively high chip-to-chip optical coupling efficiency.

FIG. 9 schematically shows an optical device 900 according to another embodiment. Device 900 has a chip-to-chip optical-coupling arrangement in which photonic chip 200 (FIG. 2) is optically coupled to another photonic chip, which is labeled in FIG. 9 using the reference numeral 990. A person of ordinary skill in the art will understand that, in an alternative embodiment of device 900, photonic chip 200 can be replaced by photonic chip 100 (FIGS. 1A-1B).

Optical device 900 is generally similar to optical device 800 (FIG. 8) in that the two corresponding on-chip waveguides are configured to be in an end-to-end optical coupling arrangement. However, photonic chip 990 differs from photonic chip 890 (FIG. 8) in that photonic chip 990 may not have any suspended portions in a photonic-circuit layer 904 thereof. For example, the adjacent edges 952 and 954 of the photonic-circuit layer 904 and of a substrate layer 902 can be coplanar in photonic chip 990, e.g., as indicated in FIG. 9. In some embodiments, the outline of substrate layer 902 on the main plane of photonic chip 990 can be such that it fully encloses the outline of photonic-circuit layer 904 thereat.

In some embodiments, photonic chip 990 can be flipped with respect to the orientation shown in FIG. 9. In the resulting flipped configuration, substrate layers 202 and 902 are located on the opposite sides of the plane running through photonic-circuit layers 104 and 904 parallel to the main planes of photonic chips 200 and 990.

The use of suspended portion $160_1$ of photonic chip 200 for optical coupling the two chips to one another in device 900 can advantageously make access to the corresponding on-chip waveguides easier, e.g., for the purposes of assembling device 900 and/or achieving a relatively high chip-to-chip optical coupling efficiency.

FIG. 10 schematically shows an optical device 1000 according to yet another embodiment. Device 1000 has a chip-to-chip optical-coupling arrangement in which photonic chip 200 (FIG. 2) is optically coupled to photonic chip 990. A person of ordinary skill in the art will understand that, in an alternative embodiment of device 1000, photonic chip 200 can be replaced by photonic chip 100 (FIGS. 1A-1B).

Optical device 1000 is a modification of optical device 900 (FIG. 9) in which the end-to-end optical-coupling geometry used in optical device 900 for optically coupling on-chip waveguides 110 and 910 is replaced by the stacking geometry indicated in FIG. 10. More specifically, in optical device 1000, the suspended portion $160_1$ of photonic-circuit layer 104 is in a vertical stacking arrangement with photonic-circuit layer 904. In this arrangement, the substrate side of suspended portion $160_1$ is positioned next to the outer surface of photonic-circuit layer 904 such that a portion of optical waveguide 110 is placed relatively close to a portion of optical waveguide 910, with the distance between the two optical-waveguide portions being sufficiently small (e.g., on the order of the wavelength of light or smaller) such that the light propagating through one of the two optical waveguides can evanescently couple into the other waveguide with relatively high optical coupling efficiency.

In some embodiments, the suspended portion $160_1$ of photonic chip 200 and the corresponding portion of photonic-circuit layer 904 of photonic chip 990 can be in direct surface-to-surface physical contact with one another, e.g., as indicated in FIG. 10. In an example embodiment, photonic-circuit layers 104 and 804 can be approximately parallel to (e.g., to within ±10 degrees of) one another. In some embodiments, the edge $152_1$ of substrate layer 202 and an edge 952 of photonic-circuit layer 904 can be in direct physical contact with one another. In some embodiments, the edge $152_1$ of substrate layer 202 and an edge 954 of substrate layer 902 can be in direct physical contact with one another.

In an example embodiment, the width of the suspended portion $160_1$ can be selected such as to optimize (e.g., maximize) the optical coupling efficiency between optical waveguides 110 and 910 through the evanescent-field coupling mechanism.

In some embodiments, photonic chip 990 can be replaced by photonic chip 100 or a second instance of photonic chip 200.

In some embodiments, photonic chip 990 can be flipped with respect to the orientation shown in FIG. 10 and placed such that photonic-circuit layer 904 is at an exterior surface 1072 of photonic chip 200. In the resulting flipped configuration, substrate layers 202 and 902 are located on the opposite sides of the plane running between photonic-circuit layers 104 and 904 parallel to the main planes of photonic chips 200 and 990.

Figure 11:
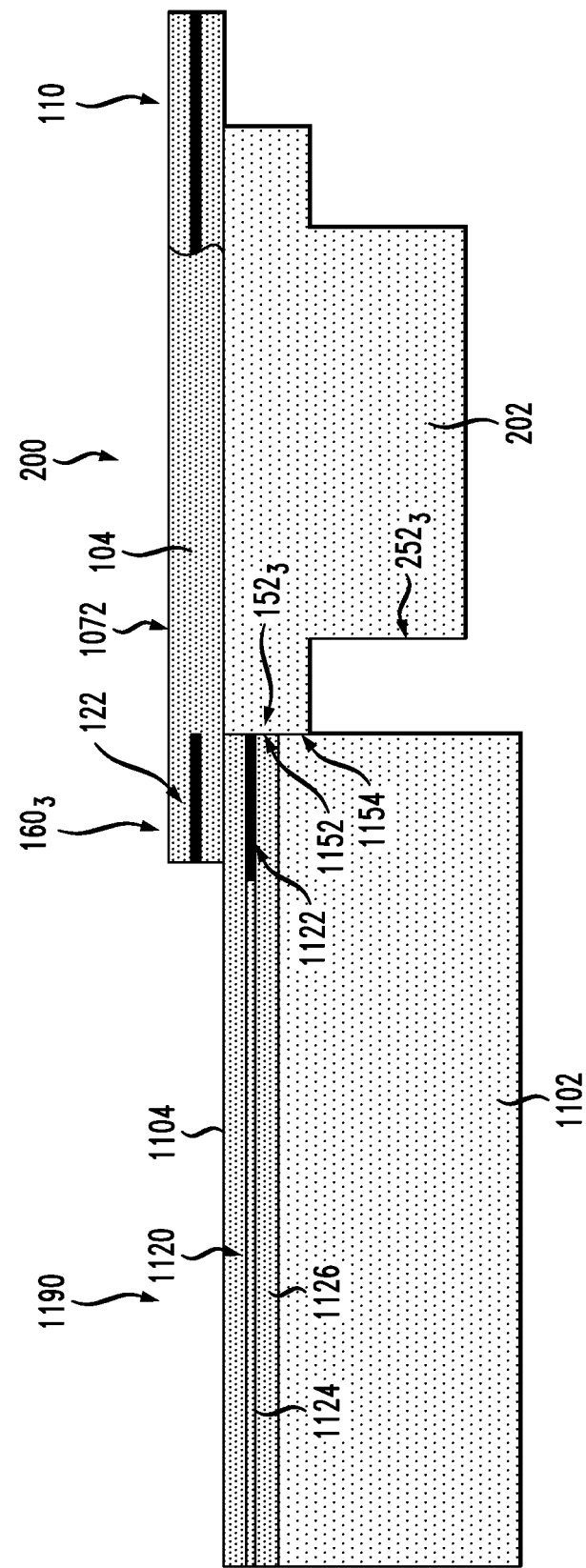
FIG. 11 schematically shows an optical device having a chip-to-chip optical coupling arrangement according to yet another embodiment.

FIG. 11 schematically shows an optical device 1100 according to yet another embodiment. Device 1100 has a chip-to-chip optical-coupling arrangement in which photonic chip 200 (FIG. 2) is optically coupled to a photonic chip 1190. A person of ordinary skill in the art will understand that, in an alternative embodiment of device 1100, photonic chip 200 can be replaced by photonic chip 100 (FIGS. 1A-1B).

In optical device 1100, an on-chip waveguide 1120 located in a photonic-circuit layer 1104 of photonic chip 1190 is optically coupled to the on-chip waveguide 120 located in photonic-circuit layer 104 of photonic chip 200 using optical gratings 122 and 1122 (also see FIG. 1B). In an example embodiment, optical grating 1122 can be similar to optical grating 122. Optical waveguide 1120 comprises a core 1124 and a cladding 1126 and can be similar to optical waveguide 120 (FIG. 1B).

In optical device 1100, the suspended portion $160_3$ of photonic-circuit layer 104 is in a vertical stacking arrangement with photonic-circuit layer 1104. In this arrangement, the substrate side of the suspended portion $160_3$ is positioned next to the outer side of photonic-circuit layer 1104 such that optical gratings 122 and 1122 are vertically placed relatively close to one another.

In operation, light can be transferred from optical waveguide 1120 to optical waveguide 120, for example, as follows. Optical grating 1122 operates to diffract light applied thereto by optical waveguide 1120 to form an output light beam propagating substantially orthogonally to the main plane of photonic-circuit layer 1104 towards optical grating 122. Optical grating 122 then operates to diffract the received light beam, thereby redirecting at least a portion of the received light into optical waveguide 120.

A person of ordinary skill in the art will understand that light can be transferred from optical waveguide 120 to optical waveguide 1120 in a similar manner.

In some embodiments, the suspended portion $160_3$ of photonic chip 200 and the corresponding portion of photonic-circuit layer 1104 of photonic chip 1190 can be in direct surface-to-surface physical contact with one another, e.g., as indicated in FIG. 11. In an example embodiment, photonic-circuit layers 104 and 1104 can be approximately parallel to (e.g., to within ±10 degrees of) one another. In some embodiments, the edge $152_3$ of substrate layer 202 and an edge 1152 of photonic-circuit layer 1104 can be in direct physical contact with one another. In some embodiments, the edge $152_3$ of substrate layer 202 and an edge 1154 of a substrate 1102 of photonic chip 1190 can be in direct physical contact with one another.

In some embodiments, photonic chip 1190 can be replaced by photonic chip 100 or a second instance of photonic chip 200.

In some embodiments, photonic chip 1190 can be flipped with respect to the orientation shown in FIG. 11 and placed such that photonic-circuit layer 1104 is at the exterior surface 1072 of photonic chip 200. In the resulting flipped configuration, substrate layers 202 and 1102 are located on the opposite sides of the plane running between photonic-circuit layers 104 and 1104 parallel to the main planes of photonic chips 200 and 1190.

In various embodiments, optical grating 1122 can be a one-dimensional grating or a two-dimensional grating.

According to an example embodiment disclosed above, e.g., in the summary section and/or in reference to any one or any combination of some or all of FIGS. 1-11, provided is an apparatus comprising a first photonic chip (e.g., 100, FIGS. 1A-1B; 200, FIG. 2) that comprises: a photonic-circuit layer (e.g., 104, FIG. 1A) having opposite first and second major surfaces (e.g., 172/174, FIG. 1A), the photonic-circuit layer comprising an optical device (e.g., 110 or 120, FIG. 1A); and a monolithic substrate (e.g., 102, FIG. 1A; 202, FIG. 2) attached by the second major surface to the photonic-circuit layer without being vertically over an edge portion of the photonic-circuit layer, the substrate being thicker than the photonic-circuit layer; and wherein at least a part of the optical device is located in the edge portion of the photonic-circuit layer. As used herein, the term "major surface" refers to a surface having the larger (e.g., largest or significantly larger) sizes, e.g., length and width, among all surfaces of the particular element. The surfaces that have one relatively large size, e.g., length, and one relatively small size, e.g., height or width, my be referred to as the edges or minor surfaces.

In some embodiments of the above apparatus, the optical device includes a first optical waveguide, an end (e.g., 118, FIG. 1A) of the first optical waveguide being located at an exterior edge (e.g., $140_1$, FIG. 1A) of the edge portion.

In some embodiments of any of the above apparatus, the apparatus further comprises an optical fiber (e.g., 510, FIG. 5) having an end (e.g., 518, FIG. 5) positioned next to the edge portion to enable transfer of light between the end of the first optical waveguide and the end of the optical fiber.

In some embodiments of any of the above apparatus, an end segment of the optical fiber is substantially (e.g., to within ±10 degrees) parallel to one of the major surfaces.

In some embodiments of any of the above apparatus, the apparatus further comprises a second photonic chip (e.g., 890, FIG. 8; 990, FIG. 9) having a second optical waveguide (e.g., 810, FIG. 8; 910, FIG. 9); wherein an end (e.g., 818, FIG. 8) of the second optical waveguide is located near or at an exterior edge (e.g., 840, FIG. 8) of the second photonic chip; and wherein the edge portion is positioned next to the second photonic chip to enable transfer of light between the first optical waveguide and the second optical waveguide (e.g., as shown in FIG. 8 or 9).

In some embodiments of any of the above apparatus, the optical device comprises an optical grating (e.g., 122, FIG. 1B) optically coupled to a first optical waveguide (e.g., 120, FIG. 1B) in the first photonic chip.

In some embodiments of any of the above apparatus, the apparatus further comprises an optical fiber (e.g., 510, FIG. 5) having an end (e.g., 518, FIG. 6 or 7) facing the optical grating.

In some embodiments of any of the above apparatus, an end segment of the optical fiber is substantially (e.g., to within ±10 degrees) orthogonal to one of the major surfaces (e.g., as shown in FIG. 6 or 7).

In some embodiments of any of the above apparatus, the first photonic chip further comprises a mirror (e.g., 610, FIG. 6) that is on one of the major surfaces in the edge portion, the mirror being configured to reflect light passing through the optical grating back toward the optical grating.

In some embodiments of any of the above apparatus, the photonic-circuit layer further comprises an optical-waveguide ring (e.g., 132, FIG. 1B) at least partially located in the edge portion and optically coupled to a first optical waveguide (e.g., 130, FIG. 1B) of the first photonic chip.

In some embodiments of any of the above apparatus, the substrate (e.g., 202, FIG. 2) has an edge with a step-like profile (e.g., 210$_1$, FIG. 2).

In some embodiments of any of the above apparatus, the apparatus further comprises a second photonic chip (e.g., 990, FIG. 10) having an optical waveguide (e.g., 910, FIG. 10); and wherein the edge portion and the second photonic chip are vertically stacked to enable transfer of light between an optical waveguide of the optical device and the optical waveguide of the second photonic chip through evanescent light coupling.

In some embodiments of any of the above apparatus, an exterior surface of the second photonic chip is on a portion of one of the major surfaces in the edge portion (e.g., as shown in FIG. 10).

In some embodiments of any of the above apparatus, an edge (e.g., 952, FIG. 10) of the second photonic chip and an edge (e.g., 152$_1$, FIG. 10) of the monolithic substrate are in direct contact with each other (e.g., as shown in FIG. 10).

In some embodiments of any of the above apparatus, the optical waveguide of the optical device and the optical waveguide of the second photonic chip are about parallel.

In some embodiments of any of the above apparatus, the photonic-circuit layer further comprises a first optical grating (e.g., 122, FIG. 1B) located in the edge portion and optically coupled to a first optical waveguide of the first photonic chip (e.g., 120, FIG. 1B); wherein the apparatus further comprises a second photonic chip (e.g., 1190, FIG. 11) having a second optical waveguide (e.g., 1120, FIG. 11) and a second optical grating (e.g., 1122, FIG. 11) optically coupled to the second optical waveguide; and wherein the edge portion and the second photonic chip are stacked such that the first optical grating is positioned in proximity to the second optical grating to enable transfer of light between the first optical waveguide and the second optical waveguide via the first and second optical gratings.

In some embodiments of any of the above apparatus, the second photonic chip comprises a substrate (e.g., 1102, FIG. 11); wherein the second optical grating has a first offset distance from the substrate of the second photonic chip; and wherein the first optical grating has a second offset distance from the substrate of the second photonic chip, the second offset distance being greater than the first offset distance.

In some embodiments of any of the above apparatus, an exterior surface of the second photonic chip is directly attached to a portion of a surface of the photonic-circuit layer located in the edge portion (e.g., as shown in FIG. 11).

In some embodiments of any of the above apparatus, an edge (e.g., 1152, FIG. 11) of the second photonic chip and an edge (e.g., 152$_1$, FIG. 10) of the monolithic substrate are in direct contact (e.g., as shown in FIG. 11).

In some embodiments of any of the above apparatus, the first optical grating and the second optical grating are about parallel.

According to another example embodiment disclosed above, e.g., in the summary section and/or in reference to any one or any combination of some or all of FIGS. 1-11, provided is an apparatus comprising a first photonic chip (e.g., 100, FIGS. 1A-1B; 200, FIG. 2) that comprises: a photonic-circuit layer (e.g., 104, FIG. 1A) having a first exterior surface (e.g., 172, FIG. 1A) and a second exterior surface (e.g., 174, FIG. 1A), the first and second exterior surfaces being opposite to one another and substantially parallel to a main plane (e.g., XY, FIGS. 1A-1B) of the first photonic chip, the photonic-circuit layer comprising a first on-chip optical waveguide (e.g., 110 or 120, FIG. 1A); and a substrate layer (e.g., 102, FIG. 1A; 202, FIG. 2) attached to the second exterior surface of the photonic-circuit layer; and wherein the photonic-circuit layer includes a suspended portion (e.g., 160$_1$ and/or 160$_3$, FIG. 1A) having at least a portion of the first on-chip optical waveguide, the suspended portion being located outside an outline (e.g., 150, FIG. 1B) of the substrate layer on the second exterior surface.

In some embodiments of the above apparatus, an end (e.g., 118, FIG. 1A) of the first on-chip optical waveguide is located at or very close to an exterior edge (e.g., 140$_1$, FIG. 1A) of the suspended portion.

In some embodiments of any of the above apparatus, the apparatus further comprises an optical fiber (e.g., 510, FIG. 5), an end (e.g., 518, FIG. 5) of which is positioned next to the exterior edge to enable end-to-end transfer of light between the first on-chip optical waveguide and the optical fiber.

In some embodiments of any of the above apparatus, an end section of the optical fiber is substantially (e.g., to within ±10 degrees) parallel to the main plain of the first photonic chip (e.g., as shown in FIG. 5).

In some embodiments of any of the above apparatus, the apparatus further comprises a second photonic chip (e.g., 890, FIG. 8; 990, FIG. 9) having a second on-chip optical waveguide (e.g., 810, FIG. 8; 910, FIG. 9); wherein an end (e.g., 818, FIG. 8) of the second on-chip optical waveguide is located at or very close to an exterior edge (e.g., 840, FIG. 8) of the second photonic chip; and wherein the exterior edge of the suspended portion is positioned next to the exterior edge of the second photonic chip to enable end-to-end transfer of light between the first on-chip optical waveguide and the second on-chip optical waveguide (e.g., as shown in FIG. 8 or 9).

In some embodiments of any of the above apparatus, the photonic-circuit layer further comprises an optical grating (e.g., 122, FIG. 1B) at least partially located in the suspended portion and optically coupled to the first on-chip optical waveguide (e.g., 120, FIG. 1B).

In some embodiments of any of the above apparatus, the apparatus further comprises an optical fiber (e.g., 510, FIG. 5), an end (e.g., 518, FIG. 6 or 7) of which is positioned at the first or second exterior surface (e.g., as shown in FIG. 6 or 7) to enable transfer of light, by way of the optical grating, between the first on-chip optical waveguide and the optical fiber.

In some embodiments of any of the above apparatus, an end section of the optical fiber is substantially (e.g., to within ±10 degrees) orthogonal to the main plain of the first photonic chip (e.g., as shown in FIG. 6 or 7).

In some embodiments of any of the above apparatus, the first photonic chip further comprises a mirror (e.g., 610, FIG. 6) directly attached to a portion of the second exterior surface located in the suspended portion and configured to reflect light passing through the optical grating back toward the optical grating.

In some embodiments of any of the above apparatus, the photonic-circuit layer further comprises an optical-waveguide ring (e.g., 132, FIG. 1B) at least partially located in the suspended portion and optically coupled to the first on-chip optical waveguide (e.g., 130, FIG. 1B).

In some embodiments of any of the above apparatus, the substrate layer (e.g., 202, FIG. 2) has a step-like feature (e.g., 210$_1$, FIG. 2) having a first edge (e.g., 152$_1$, FIG. 2) and a second edge (e.g., 252$_1$, FIG. 2), the first edge being located at a border of the outline, and the second edge being substantially parallel to the first edge and located at an offset distance therefrom inside the outline.

In some embodiments of any of the above apparatus, the apparatus further comprises a second photonic chip (e.g., 990, FIG. 10) having a second on-chip optical waveguide (e.g., 910, FIG. 10); and wherein the suspended portion and the second photonic chip are stacked such that the portion of the first on-chip optical waveguide is positioned in proximity to a portion of the second on-chip optical waveguide to enable transfer of light between the first on-chip optical waveguide and the second on-chip optical waveguide through evanescent-field coupling.

In some embodiments of any of the above apparatus, an exterior surface of the second photonic chip is directly attached to a portion of the second exterior surface of the photonic-circuit layer located in the suspended portion (e.g., as shown in FIG. 10).

In some embodiments of any of the above apparatus, an edge (e.g., 952, FIG. 10) of the second photonic chip and an edge (e.g., 152$_1$, FIG. 10) of the substrate layer are in direct contact with each other (e.g., as shown in FIG. 10) or are very close to each other.

In some embodiments of any of the above apparatus, the portion of the first on-chip optical waveguide and the portion of the second on-chip optical waveguide are parallel to one another.

In some embodiments of any of the above apparatus, the photonic-circuit layer further comprises a first on-chip optical grating (e.g., 122, FIG. 1B) located in the suspended portion and optically coupled to the first on-chip optical waveguide (e.g., 120, FIG. 1B); wherein the apparatus further comprises a second photonic chip (e.g., 1190, FIG. 11) having a second on-chip optical waveguide (e.g., 1120, FIG. 11) and a second on-chip optical grating (e.g., 1122, FIG. 11) optically coupled to the second on-chip optical waveguide; and wherein the suspended portion and the second photonic chip are stacked such that the first on-chip optical grating is positioned in proximity to the second on-chip optical grating to enable transfer of light between the first on-chip optical waveguide and the second on-chip optical waveguide by way of the first and second on-chip optical gratings.

In some embodiments of any of the above apparatus, the second photonic chip comprises a substrate (e.g., 1102, FIG. 11); wherein the second on-chip optical grating has a first offset distance from the substrate of the second photonic chip; and wherein the first on-chip optical grating has a second offset distance from the substrate of the second photonic chip, the second offset distance being greater than the first offset distance.

In some embodiments of any of the above apparatus, an exterior surface of the second photonic chip is directly attached to a portion of the second exterior surface of the photonic-circuit layer located in the suspended portion (e.g., as shown in FIG. 11).

In some embodiments of any of the above apparatus, an edge (e.g., 1152, FIG. 11) of the second photonic chip and an edge (e.g., 152$_1$, FIG. 10) of the substrate layer are in direct contact with each other (e.g., as shown in FIG. 11) or are very close to each other.

In some embodiments of any of the above apparatus, the first on-chip optical grating and the second on-chip optical grating are parallel to one another.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the electrodes are horizontal but would be horizontal where the electrodes are vertical, and so on. Similarly, while all figures show the different layers as horizontal layers such orientation is for descriptive purpose only and not to be construed as a limitation.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

As used herein and in the claims, the term "provide" with respect to a system, device, or component encompasses designing or fabricating the system, device, or component; causing the system, device, or component to be designed or fabricated; and/or obtaining the system, device, or component by purchase, lease, rental, or other contractual arrangement.

What is claimed is:

1. An apparatus comprising a first photonic chip that comprises:
   a photonic-circuit layer having opposite first and second major surfaces, the photonic-circuit layer comprising an optical device that includes a first optical waveguide; and
   a monolithic substrate attached to the photonic-circuit layer by the second major surface without being vertically over or under an edge portion of the photonic-circuit layer, the monolithic substrate being thicker than the photonic-circuit layer; and
   wherein a part of the optical device is located in the edge portion of the photonic-circuit layer, said part of the optical device including an end of the first optical waveguide.

2. The apparatus of claim 1, wherein the end of the first optical waveguide is located at an exterior edge of the edge portion.

3. The apparatus of claim 2, further comprising an optical fiber having an end positioned next to the edge portion to enable transfer of light between the end of the first optical waveguide and the end of the optical fiber.

4. The apparatus of claim 2, further comprising a second photonic chip having a second optical waveguide;
   wherein an end of the second optical waveguide is located near or at an exterior edge of the second photonic chip; and
   wherein the edge portion is positioned next to the second photonic chip to enable transfer of light between the first optical waveguide and the second optical waveguide.

5. The apparatus of claim 1, wherein the optical device comprises an optical grating optically coupled to the first optical waveguide in the first photonic chip.

6. The apparatus of claim 5, further comprising an optical fiber having an end facing the optical grating.

7. The apparatus of claim 6, wherein an end segment of the optical fiber is substantially orthogonal to one of the major surfaces.

8. The apparatus of claim 5, wherein the first photonic chip further comprises a mirror at one of the major surfaces in the edge portion, the mirror being configured to reflect light passing through the optical grating back toward the optical grating.

9. The apparatus of claim 1, wherein the photonic-circuit layer further comprises an optical-waveguide ring at least partially located in the edge portion and optically coupled to the first optical waveguide of the first photonic chip.

10. The apparatus of claim 1, wherein the substrate has an edge with a step-like profile.

11. An apparatus comprising a first photonic chip that comprises:
    a photonic-circuit layer having a first major surface and a second major surface, the first and second major surfaces being opposite to one another and substantially parallel to a main plane of the first photonic chip, the photonic-circuit layer comprising an on-chip optical waveguide; and
    a monolithic substrate attached to the second major surface of the photonic-circuit layer; and
    wherein the photonic-circuit layer includes an edge portion having located therein an end of the on-chip optical waveguide, the edge portion being located outside an outline of the monolithic substrate on the second major surface.

12. An apparatus comprising a first photonic chip that comprises:
    a photonic-circuit layer having opposite first and second major surfaces, the photonic-circuit layer comprising an optical device; and
    a monolithic substrate attached to the photonic-circuit layer by the second major surface without being vertically over or under an edge portion of the photonic-circuit layer, the monolithic substrate being thicker than the photonic-circuit layer;
    wherein at least a part of the optical device is located in the edge portion of the photonic-circuit layer;
    wherein the apparatus further comprises a second photonic chip having an optical waveguide; and
    wherein the edge portion and the second photonic chip are vertically stacked to enable transfer of light between an optical waveguide of the optical device and the optical waveguide of the second photonic chip through evanescent light coupling.

13. The apparatus of claim 12, wherein an exterior surface of the second photonic chip is on one of the major surfaces in the edge portion.

14. The apparatus of claim 12, wherein an edge of the second photonic chip and an edge of the monolithic substrate are in direct contact with each other.

15. The apparatus of claim 12, wherein the optical waveguide of the optical device and the optical waveguide of the second photonic chip are about parallel.

16. An apparatus comprising a first photonic chip that comprises:
- a photonic-circuit layer having opposite first and second major surfaces, the photonic-circuit layer comprising an optical device; and
- a monolithic substrate attached to the photonic-circuit layer by the second major surface without being vertically over or under an edge portion of the photonic-circuit layer, the monolithic substrate being thicker than the photonic-circuit layer;
- wherein at least a part of the optical device is located in the edge portion of the photonic-circuit layer;
- wherein the photonic-circuit layer further comprises a first optical grating located in the edge portion and optically coupled to a first optical waveguide of the first photonic chip;
- wherein the apparatus further comprises a second photonic chip having a second optical waveguide and a second optical grating optically coupled to the second optical waveguide; and
- wherein the edge portion and the second photonic chip are stacked such that the first optical grating is positioned in proximity to the second optical grating to enable transfer of light between the first optical waveguide and the second optical waveguide via the first and second optical gratings.

17. The apparatus of claim 16,
wherein the second photonic chip comprises a substrate;
wherein the second optical grating has a first offset distance from the substrate of the second photonic chip; and
wherein the first optical grating has a second offset distance from the substrate of the second photonic chip, the second offset distance being greater than the first offset distance.

18. The apparatus of claim 16, wherein an exterior surface of the second photonic chip is directly attached to one of the major surfaces in the edge portion.

19. The apparatus of claim 16, wherein an edge of the second photonic chip and an edge of the monolithic substrate are in direct contact.

20. The apparatus of claim 16, wherein the first optical grating and the second optical grating are about parallel.

* * * * *